United States Patent
Cooper et al.

(10) Patent No.: US 8,015,549 B2
(45) Date of Patent: Sep. 6, 2011

(54) TECHNIQUES FOR MONITORING APPLICATION CALLS

(75) Inventors: Brian Collings Cooper, Orem, UT (US); Stephen R. Carter, Spanish Fork, UT (US)

(73) Assignee: Novell, Inc., Provo, UT (US)

( * ) Notice: Subject to any disclaimer, the term of this patent is extended or adjusted under 35 U.S.C. 154(b) by 1475 days.

(21) Appl. No.: 11/125,874

(22) Filed: May 10, 2005

(65) Prior Publication Data

US 2006/0259899 A1    Nov. 16, 2006

(51) Int. Cl.
    *G06F 9/44* (2006.01)
(52) U.S. Cl. ........ 717/124; 717/126; 717/127; 717/130; 717/131
(58) Field of Classification Search .......... None
    See application file for complete search history.

(56) References Cited

U.S. PATENT DOCUMENTS

| | | | |
|---|---|---|---|
| 5,548,718 A * | 8/1996 | Siegel et al. .................... | 714/38 |
| 5,819,093 A | 10/1998 | Davidson et al. | |
| 6,042,614 A | 3/2000 | Davidson et al. | |
| 6,119,247 A | 9/2000 | House et al. | |
| 6,219,803 B1 | 4/2001 | Casella et al. | |
| 6,263,456 B1 | 7/2001 | Boxall et al. | |
| 6,442,749 B1 * | 8/2002 | Hirao et al. .................... | 717/170 |
| 6,633,888 B1 * | 10/2003 | Kobayashi ........................... | 1/1 |
| 6,782,386 B1 | 8/2004 | Gebauer | |
| 6,862,711 B1 | 3/2005 | Bahrs et al. | |
| 6,957,256 B1 * | 10/2005 | Bradley et al. ................ | 709/223 |
| 7,284,194 B2 * | 10/2007 | Gupta ............................ | 715/205 |
| 7,328,134 B1 * | 2/2008 | Burbidge et al. ............. | 702/186 |
| 7,523,447 B1 * | 4/2009 | Callahan et al. .............. | 717/135 |
| 7,581,170 B2 * | 8/2009 | Baumgartner et al. ....... | 715/234 |
| 2002/0133807 A1 * | 9/2002 | Sluiman ........................ | 717/124 |
| 2004/0133897 A1 * | 7/2004 | Covely, III .................... | 719/328 |
| 2004/0210877 A1 * | 10/2004 | Sluiman et al. ............... | 717/130 |
| 2005/0050548 A1 * | 3/2005 | Sheinis et al. ................ | 719/311 |
| 2005/0144315 A1 * | 6/2005 | George et al. ................. | 709/238 |
| 2006/0005132 A1 * | 1/2006 | Herdeg, III ................... | 715/704 |
| 2006/0184918 A1 * | 8/2006 | Rosaria et al. ................ | 717/124 |
| 2008/0148239 A1 * | 6/2008 | Petrov et al. .................. | 717/128 |

* cited by examiner

*Primary Examiner* — Insun Kang
(74) *Attorney, Agent, or Firm* — Schwegman, Lundberg & Woessner, P.A.

(57) ABSTRACT

Techniques for debugging applications are provided. Access to an application is controlled by a wrapper. The wrapper intercepts calls to the application and records the calls. The calls are then passed to the application for processing. The recorded calls form a log which may be analyzed or mined to detect error conditions or undesirable performance characteristics associated with the application independent of source associated with the application.

17 Claims, 3 Drawing Sheets

US 8,015,549 B2

TECHNIQUES FOR MONITORING APPLICATION CALLS

FIELD

The invention relates generally to debugging and more particularly to techniques for debugging applications.

BACKGROUND

Debugging an application can be particularly difficult when the application is not owned by a consumer/customer or when the source code associated with an application is no longer available by an owner of the application. In some cases, a customer may encounter problems for an application that was not upgraded or an application whose license was not renewed. Thus, the only believed way in which such an application can be fixed is to acquire a new version of the application via a renewed or upgraded license. Such an option may not be financially practical for some customers.

In short, some applications may have actually been in use for many years. Very often, these applications cannot be debugged at a symbolic level because the applications lack their source code, such that an engineer cannot compile and/or link the applications for purposes of inserting breakpoints and other debugging statements into executing version of the applications. It may also not be possible to load the application into an automated debugger, because the error may not present itself within the automated debugger, which is located outside a typical production environment for the application. Essentially, the error may only present itself within a production environment, such that the automated debugger is incapable of recreating a failure state which was produced only within the production environment.

In fact, often the application is viewed as a black box to a consumer or an engineer. Furthermore, a black box is typically debugged by analyzing memory dumps. Analyzing a memory dump is not a desired technique for debugging; is often time consuming; and can involve a lot of guess work on the part of an engineer.

Accordingly, improved techniques for debugging applications are needed in order to improve debugging associated with applications that are viewed as black boxes.

SUMMARY

In various embodiments, debugging techniques for applications are presented. More specifically, and in an embodiment, a wrapper is generated for an application. The wrapper is executed when an issuer makes a call for the application. The wrapper records the call made by the issuer and passes the call through to the application for subsequent processing.

DETAILED DESCRIPTION

An "application" includes a software service or system. In an embodiment, the application also includes one or more header files that are used to create executable versions of the application or are consumed dynamically by the executable versions. The applications are viewed as black boxes meaning that the source code of the applications are not debugged or modified for purposes of analyzing or debugging the applications when errors are encountered with the applications.

A "wrapper" is a script or specialized control application that controls the input and output of a black box application. A wrapper presents itself to an issuer or caller as if it where an application. The wrapper's job is to record information associated with the issuer and to record calls made to methods or functions of the application and to pass the calls made by the issuer along to the application for execution. The wrapper appears to be the issuer to the application and the wrapper also appears to be the application to the issuer. Results associated with the calls are also processed through the wrapper and sent back to the issuer. Moreover, an issuer can itself be an application or another instance of a wrapper.

It is also to be understood that although the term script is used herein in connection with the wrapper that for purposes of embodiments presented herein a script may be an interpreted application that does not need compiled to be executed or it may be considered a control application that is compiled before executed.

Various embodiments of this invention can be implemented in existing network architectures. For example, in some embodiments, the techniques presented herein are implemented in whole or in part in the Novell® network and proxy server products, distributed by Novell®, Inc., of Provo, Utah.

Of course, the embodiments of the invention can be implemented in a variety of architectural platforms, operating and server systems, or applications. Any particular architectural layout or implementation presented herein is provided for purposes of illustration and comprehension only and is not intended to limit aspects of the invention.

Figure 1:
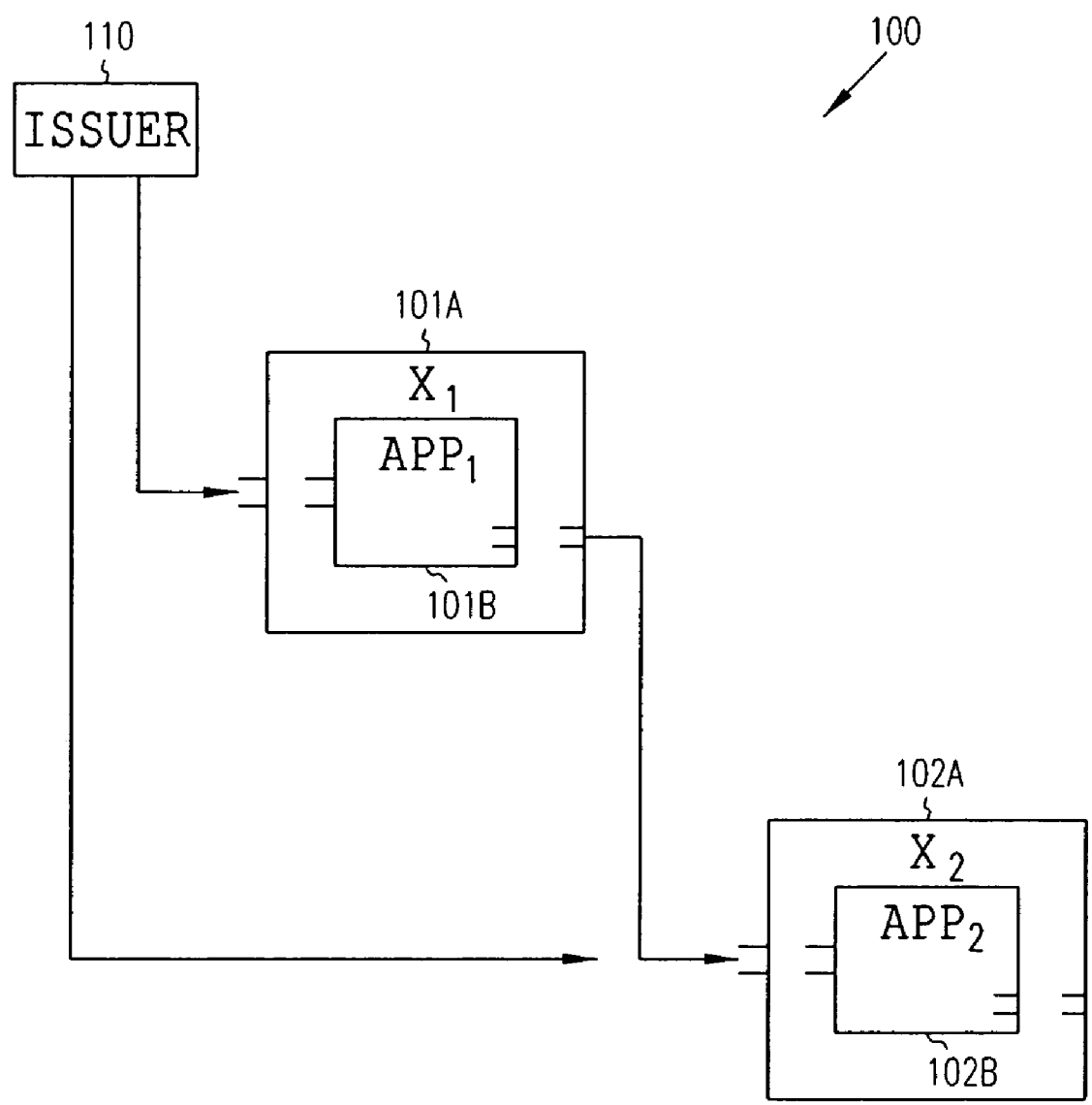
FIG. 1 is a diagram of a wrapper architecture, according to an example embodiment.

FIG. 1 is a diagram of a wrapper architecture 100, according to an example embodiment. The architecture 100 is implemented in a machine-accessible and readable medium and is accessible over a network. The wrapper architecture 100 facilitates real-time and dynamic debugging of an application that is viewed as a black box.

That is, information necessary for debugging a black box application is dynamically captured unbeknownst to the application or the issuer. In some cases, the debug information may be dynamically analyzed for purposes of resolving perceived problems with the application's processing or perceived problems associated with information passed by the issuer to the application.

The architecture 100 includes a one or more wrappers 101A and 102A. Each wrapper 101A and 102A logically controls the input and output of a black box application 101B or 102B. An issuer 110 is unaware of the wrappers 101A and 102A.

One technique for making the issuer 110 unaware of the wrappers 101A and 102A is to name the wrappers 101A and 102A after the applications 101B and 102B, respectively, and to rename the application 110 to a name known by the wrappers 101A and 102A. It is noted that in some cases the wrapper 101A may be unaware of the wrapper 102A, in this sense the wrapper 101A may be viewed as an issuer with respect to the wrapper 102A. Moreover, each wrapper 101A and 102A may be nested within other wrappers.

In an embodiment, the wrappers 101A and 102A are scripts; the scripts may be defined by a schema, such as an extensible schema definition (XSD). Each schema defines calls associated with the applications 101B and 102B and actions that the wrappers 101A and 102A may take with each call. One action taken with each call is to record the call in a log or to interactively generate an extensible markup language (XML) document as a debugging log.

According to an embodiment, the schema which defines the wrappers 101A and 102A may be automatically generated. For example, the methods or calls and the parameters associated therewith may be automatically parsed from header files associated with the applications 101B and 102B. During the parsing of the header files, the schema is generated. The schema allows for a rich descriptive language that provides more information for generating the wrappers 101A and 102A.

Each wrapper 101A and 102A isolates the input calls associated with the applications 101B and 102B. That is, the Application Programming Interface (API) associated with the applications 101B and 102B is captured and accepted by the wrappers 101A and 102A. Moreover, the outputs produced by each of the applications 101B and 102B are captured by the wrappers 101A and 102A and communicated back to the issuer 110. Essentially, the wrappers 101A and 102A become the API for the issuer 110, and the actual APIs of the applications 101B and 102B are called and interfaced to by the wrappers 101A and 102A.

Calls made by the issuer 110 to the applications 101B and 102B are intercepted and directed, unbeknownst to the issuer 110, to the wrappers 101A and 102A. The wrappers 101A and 102A log the calls and perhaps a variety of other information, such as time of day, identity of issuer 110, account information, and the like. The wrappers 101A and 102A may also manipulate the incoming and/or outgoing information. Moreover, the wrappers 101A and 102A also log output information communicated from the applications 101B and 102B before the output information is communicated back to the issuer 110.

It is apparent that the source code for the applications 101B and 102B do not have to be available for an engineer to benefit from the architecture 100 of the wrappers 101A and 102A. The wrappers 101A and 102A record calls and other information being made by the issuer 110 and therefore know the sequence of events transpiring between an issuer 110 and a particular wrapper 101A or 102A. In this manner, if an error or problem is detected the sequence of events and interactions can be played back to recreate a state that existed immediately before an error was detected. This playback capability allows an engineer or even automated applications to determine parameter values and other information that may have caused the error or problem. Thus, a fix for the error may be made within the execution logic of the wrappers 101A and 102A and does not have to be made to source code associated with the applications 101B and 102B. Although, in some embodiments, a fix to the source code of the applications 101B and 102B may be desirable and may be more easily pinpointed with the play back capabilities.

An issuer 110 may not be capable of communicating exactly what transpired before the issuer 110 noticed an error. But, this communication is not necessary with the architecture 100 presented herein because the wrappers 101A and 102A keep track of what transpired for the issuer 110 and include the information in a log or XML document. Any engineer or automated service may consume the log or XML document for purposes of recreating and analyzing events leading up to a detected error or problem. Moreover, the log can be assembled from a collection of other logs, data store records, and the like. It should also be understood that XML document or log can be used interchangeably herein.

With the architecture 100 the processing flow of an issuer 110 with respect to calls to an application 101B or 102B may be tagged and information recorded without making any modifications to the issuer 110 or to the applications 101B and 102B. The wrappers 101A and 102A may be interposed in between the issuer 110 and the applications 101B and 102B without the knowledge of the issuer 110 and without the knowledge of the applications 101A and 102B.

In an embodiment, the wrappers 101A and 102A are executed when an issuer 110 makes calls to the applications 101B and 102B. When the wrappers 101A and 102A execute, XML documents are generated having a marked up or tagged processing flow associated with interactions of the issuer 110 and the applications 101B and 102B. The XML documents may be automatically merged with other information, may have selective information extracted, and may be analyzed when errors are detected or when performance appears to be problematic or undesirable. Corrections or improvements may then be made within the wrappers 101A and 102A and/or within the applications 101B and 102B.

According to an embodiment, the wrappers 101A and 102A are nested and unaware of one another, such that one wrapper 101A appears as an issuer to the other wrapper 102A. Information related to execution states and sequences may be tagged and catalogued for analysis. Thus, debugging techniques for a black box may be recursive such that interactions between multiple black boxes may be captured and logged, each interaction may itself generate an XML document with similar classifications/tags and in some cases similar global recorded variables (e.g., account number, identities, etc.). The XML documents may be analyzed via an XSD that merges or ties the XML documents together to extract selective information. This is especially beneficial, for example, when xs:ID and xs:IDREF schema directives are used to automatically index global recorded variables.

Furthermore, in an embodiment, additional services or daemons may contribute to any real-time and dynamic log that is being created. This may be done by creating services that monitor the log or XML document as it is being generated where the services take actions to contribute to the log when certain states or identities are detected. The services may also optionally send notifications to entities.

Additionally, in an embodiment, the log may be mined for purposes of improving runtime performance of black box applications 101B and 102B. Certain states or conditions may be discovered where performance of the applications 101B and 102B degrades and these states may be compared to other states where performance is acceptable. Adjustments may then be made to the wrappers 101A and 102A to fix the degraded states, such that the wrappers 101A and 102A adjust the order of calls made to the applications 101B and 102B and/or adjust parameter values passed to the applications 101B and 102B. In other cases, the discovered information may be fed to a vendor of the applications 101B and 102B so that adjustments may be made within the applications 101B and 102B.

It is now appreciated, how the wrapper architecture 100 may be implemented to provide customized, real time, and dynamic debugging of black box applications 101B and 102B. This provides an environment and a technique for discovering and fixing error conditions associated with applications 101B and 102B and for discovering and adjusting performances associated with applications 101B and 102B.

It is noted, that in FIG. 1 the lines to the left of the wrappers 101A and 102A illustrate input functions, methods, or calls associated with the black box applications 101B and 102B. Moreover, the lines to the right of the wrappers 101A and 102A depict output or return values provided by the applications 101B and 102B. The issuer 110 is unaware of the wrappers 101A and 102A and the applications 101B and 102B are also unaware of the wrappers 101A and 102A.

Figure 2:
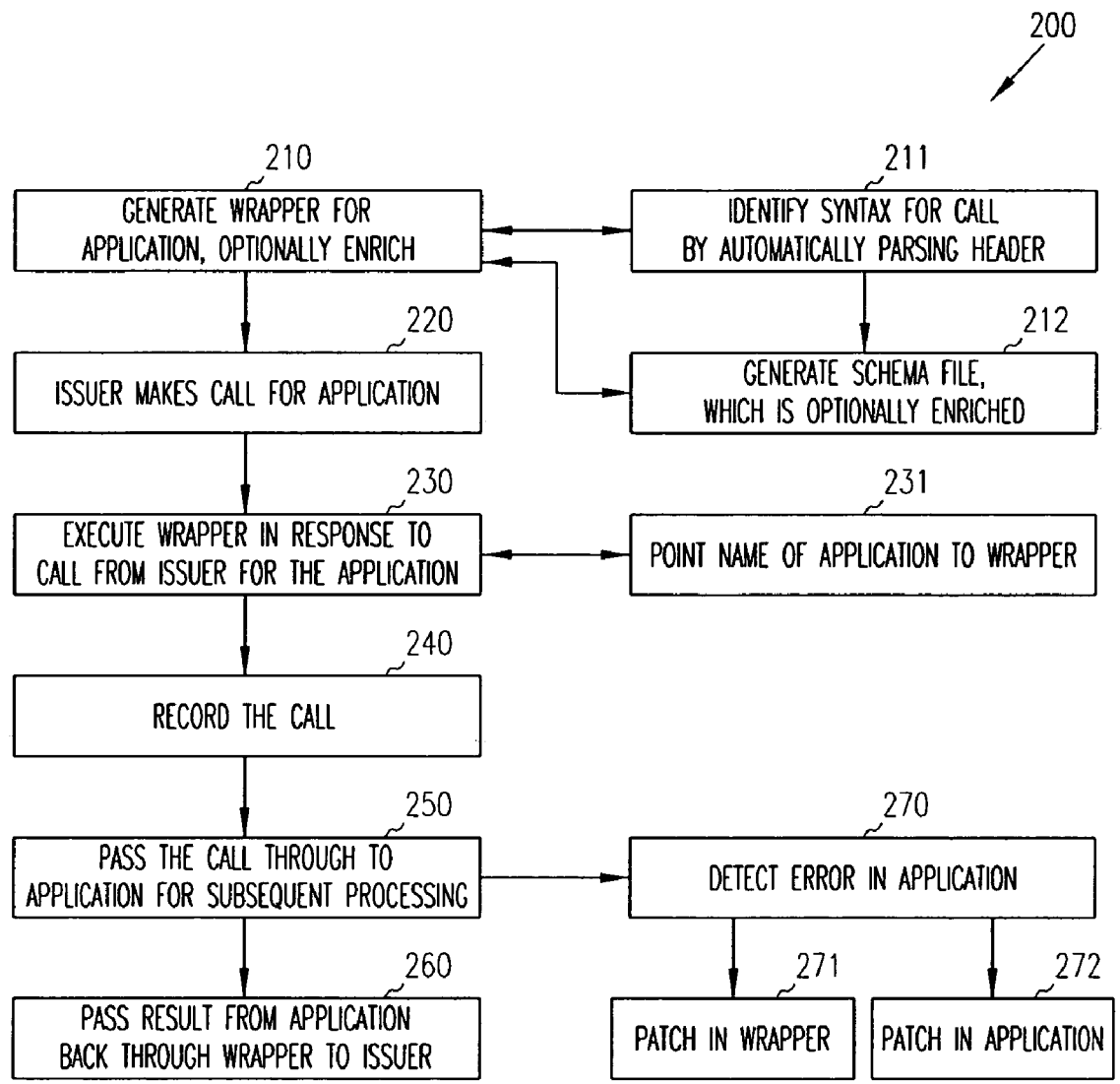
FIG. 2 is a diagram of a method for application debugging, according to an example embodiment.

FIG. 2 is a diagram of a method 200 for application debugging, according to an example embodiment. The method 200 (hereinafter "debugging service") is implemented in a machine-accessible and readable medium and is accessible over a network. The network may be wired, wireless, or a combination of wired and wireless. In an embodiment, the debugging service operates within the architecture 100 of FIG. 1 as the wrappers 101A and 102A. It is noted that the processing associated with the debugging service of FIG. 1 may be recursive and nested, meaning that one instance of the debugging service may interact with other instances of the debugging service.

At 210, the debugging service generates a wrapper for a black box application. The generated wrapper may also be optionally enriched. For example, an engineer may provide some optional enrichment to provide further analyses or enhancements. Enrichment may be achieved through manual services, such as an engineer, or through automated services designed to add feature enhancements or further analysis to the wrapper logic. A variety of techniques may be deployed to generate the wrapper.

One technique for generating a wrapper is depicted at 211, where the debugging service initially parses and evaluates header files associated with the application and identifies calls, parameters for the calls, and syntaxes for the calls of the application via the header files associated with the application. This information may be used to construct a schema, such as an XSD (as depicted in 212). The XSD includes XML elements for each call associated with the application and actions for the wrapper. Some actions may simply log the identity of the issuer and record a time/date stamp. A single XML element can be customized to include a variety or plurality of actions. In an embodiment, some other actions may record a customer account, a customer identifier, an account identifier, and other desired information.

In another embodiment, at 212, a schema file may be generated from the parsed header files or through some other external mechanism, such as another service or an engineer. The schema file assists in generating the wrapper. Moreover, the schema, similar to the wrapper, may be optionally enriched to define enhanced relationships and indexing within the wrapper. Enrichment to the schema may be achieved via any external mechanism, such as a service or an engineer.

At 220, the debugging service via the generated wrapper detects that an issuer has made a call to the application. This causes the wrapper to execute, at 230, in response to the call made by the issuer. The wrapper may intercept and process the call by appearing to the issuer to be the application or the API associated with the application. A technique for achieving this was discussed above with the wrapper architecture 100 of FIG. 1. For example, at 231, the API or execution name of the application may be dynamically or statically associated with the name of the wrapper. The original name of the API or executing version of the application may be slightly altered within the machine environment, such that the wrapper is aware of the new name for contacting the application. In this manner, the application is unaware of the presence of the wrapper and believes that it is directly calling and interacting with an API of the application.

At 240, the debugging service records the call made by the issuer in a log. In an embodiment, the log may be a tagged document, such as an XML document that is dynamically produced in real time by the debugging service. The log includes at a minimum execution sequences and calls made by the issuer to the API of the application. As has been stated above, the log may also include additional configured and desired information about the execution environment or other information associated with the issuer and information about the call.

At 250, the debugging service passes the call through to the application for subsequent processing. The application views the wrapper as the issuer, such that, at 260, any result produced in response to the call is passed back from the application to the wrapper and the wrapper in turn passes that result back to the original issuer.

In an embodiment, at 270, an error or undesirable performance may be detected in the application. This detection may be made by the debugging service or may be subsequently reported by the issuer. At 271, the error may be patched as a work around from within the execution logic of the wrapper. This may be beneficial when the source code for the application is unavailable and when the parameters associated with a call or the sequencing of multiple calls can be manipulated within the wrapper's logic to cause the application to process correctly or process in a more favorable manner. In some cases, the error may be that a parameter supplied by the issuer with the original call was in an unexpected format that the application did not check for and did not report before the unexpected format resulted in an error in the application. In this situation, the wrapper may be used to detect the unexpected format and to immediately report that it is in error back to the issuer before the call and the unexpected format is actually passed through to the application. In other cases, the wrapper may be capable of fixing a minor parameter format error on behalf of the issuer and pass a correct parameter format for the call onto the application for purposes of generating a correct result from the application. A variety of error conditions or unexpected performance situations may be detected; each such condition or situation is intended to fall within the scope of the embodiments presented herein.

In yet another embodiment, at 272, the detected error or performance problem may be patched within the application itself. This may occur when the source of the application is available or where a vendor for the application is contacted to supply a corrected version of the application covering the fix.

In some instances, the wrapper may be used to make a variety of fixes to detected errors and after some configurable amount of fixes or time; the fixes may be migrated to a newer version or release of the application. Thus, the techniques presented herein allow for scheduled releases of an application and provides for immediate resolutions for consumers while the consumers are waiting on a new release of the application.

Figure 3:
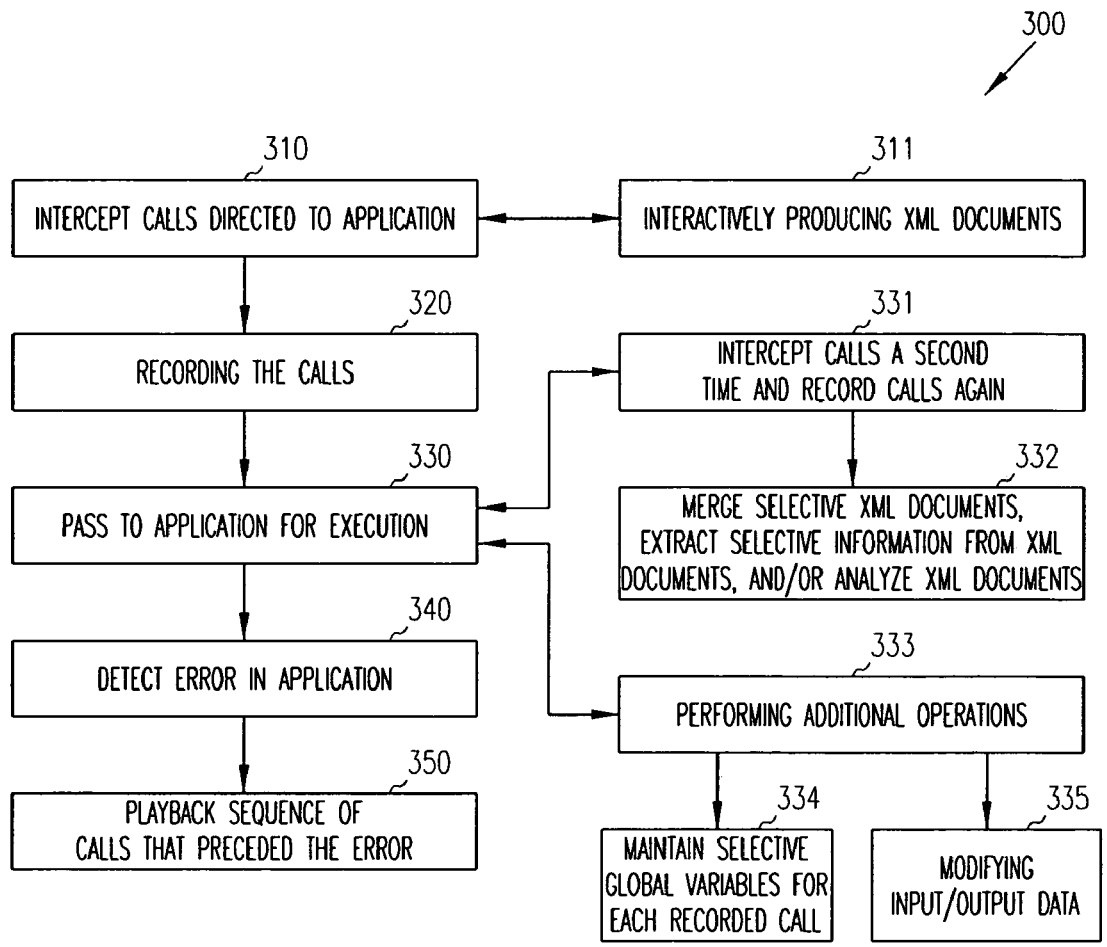
FIG. 3 is a diagram of another method for application debugging, according to an example embodiment.

FIG. 3 is a diagram of another method 300 for application debugging, according to an example embodiment. The method 300 (herein after "wrapper service") is implemented in a machine-accessible and readable format and is accessible over a network. In an embodiment, the wrapper service implements the wrapper processing discussed above with the wrapper architecture 100 of FIG. 1 and discussed above with the wrapper processing of the method 200 of FIG. 2, which is represented by the debugging service.

At 310, the wrapper service intercepts calls directed to an application or an application's API (e.g., methods, functions, operations, etc.). Again, this may be achieved by presenting the wrapper service as if it where the application or the application's API to the issuer and renaming the application or the API to a name known to the wrapper service.

In an embodiment, at 311, the wrapper service as it executes interactively produces or generates one or more XML documents. The XML documents are essentially an execution log for interactions occurring with the application and an issuer. The log is marked up or tagged to include content-rich information, which may be subsequently mined, merged, or extracted to debug the application.

At 320, the wrapper service records the calls made to the application in a log, such as the XML document generated at 311. The resulting log may be evaluated dynamically by other services or may be evaluated offline by an engineer.

At 330, the wrapper service passes the calls to the application for execution. In some cases, the wrapper service may have been previously modified to adjust the calls originally supplied by the issuer to formats or sequencing orders that result in more desirable behavior in the application. Moreover, in one embodiment, the wrapper service may have been previously modified to actually perform the call within the execution space of the wrapper service and to not pass the call to the application.

In an embodiment, at 331, the passing of the calls may actually result in the calls being intercepted by another nested or recursive instance of the wrapper service, such that the calls are intercepted a second time and the calls are recorded a second time. This occurs when the wrapper service attempts to pass the calls through to the application, and the application is actually controlled by another wrapper service. In this case the first wrapper service is the issuer to the second wrapper service. This nesting or recursion may occur as many times as is desired or arranged within the machine execution environment. An example of this nesting was presented above as wrapper 101A and wrapper 102A of the wrapper architecture 100 of FIG. 1.

In still another embodiment, at 332, the multiple wrapper service instances may generate multiple logs or XML documents for calls made by the issuer. These XML documents may be dynamically and selectively merged with one another, may have selective information extracted from them, and/or may be analyzed as desired for purposes of discovering error conditions or unacceptable processing performance scenarios.

Before the calls are actually passed to the application for execution, the wrapper service may, at 333, perform a variety of additional operations beyond just recording the call. For example, at 334, the wrapper service may record within the log or XML documents global variables or state information for each recorded call. This creates a content-rich and tagged stream of information about the execution sequence of the application without actually inserting break points or other debugging code within the application. This is especially beneficial when the source code associated with the application is not available. Thus, global variables and execution states associated with the application may be maintained and captured by processing additional operations beyond simply recording the call within a log.

In yet another embodiment, at 335, the wrapper service may actually use actions to modify input/output data associated with a call before the call is passed to the application for execution. Thus, as was discussed above, fixes to errors or problems may be corrected by the wrapper service before the errors or problems have a chance to surface within the application.

In an embodiment, at 340, the wrapper service may subsequently become aware of an error or performance issue associated with the application. The problem may be dynamically detected by the wrapper service; such as when the application aborts, terminates, or unexpectedly hangs (becomes unresponsive). Alternatively, the problem maybe communicated by the issuer who believes that it is directly interacting with the application.

When a problem is detected, at 350, either the wrapper service or another service maybe used to playback an execution sequence associated with the problem, where that execution sequence immediately preceded the problem. The playback can be initiated by an engineer from the log and may be monitored for purposes of debugging the application's execution sequence. In some cases, the engineer may elect to insert more informative actions within the wrapper to capture additional environmental information during the playback for purposes of better determining or recognizing the problem during the playback. This playback feature permits the engineer to substantially recreate the problem within the machine execution environment used by the issuer. Traditionally, this capability was not available meaning that some problems associated with the execution or production environment were difficult to discover or never discovered at all.

It should be noted that the processing of the methods 200 and 300 may be implemented as instructions on a machine or a computer-readable medium. The medium may be removable, such that the instructions are interfaced to a machine, uploaded to the machine and processed. Alternatively, the medium may reside on a remote machine and downloaded to another machine over network, where they are processed. In still other embodiments, the medium is memory and/or storage that are prefabricated within a machine. Furthermore, in an embodiment, the instructions are represented as statements within a schema, such as an XSD and are processed when references to the application or the application's API are made by the issuer. The XSD may reside on a medium or may be stored and retrieved as desired from a data store, such as a directory, database, data warehouse, etc.

Figure 4:
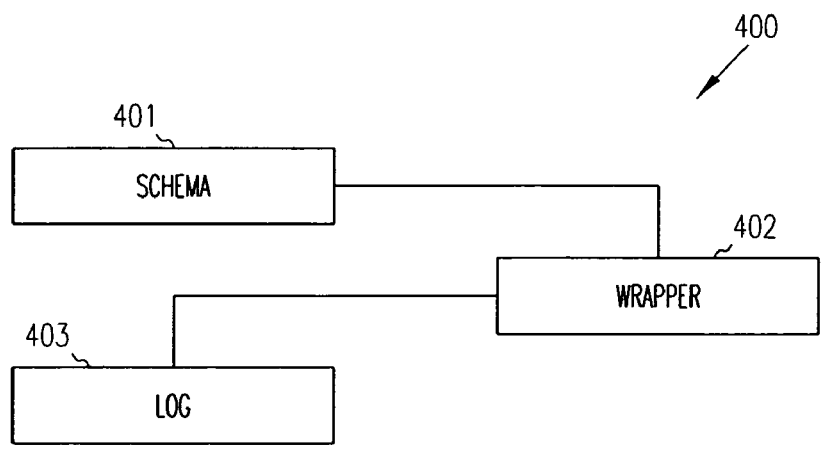
FIG. 4 is a diagram of an application debugging system, according to an example embodiment.

FIG. 4 is a diagram of an application debugging system 400, according to an example embodiment. The application debugging system 400 is implemented in a machine-accessible and readable medium and is accessible over a network. In an embodiment, the application debugging system 400 implements, among other things, the methods 200 and 300 of FIGS. 2 and 3 and the architecture 100 of FIG. 1.

The application debugging system 400 includes a schema 401, a wrapper 402, and a log 403. Initially, the log 403 may be null or may be non-existent until the wrapper 402 is processed. Similarly, the wrapper 402 may be initially empty or non existent until the schema 401 is created. Each of these will now be discussed in turn.

The schema 401 defines the processing actions of the wrapper 402. In an embodiment, the schema is an XSD which is generated automatically by parsing header files associated with an application to acquire the syntax and calls associated with interfaces of the application. The schema 402 defines calls made by an issuer and provides one or more actions that the wrapper 402 performs in response to detecting the calls. At a minimum, one such action is to record the call made by the issuer to the application in the log 403. Of course, as was discussed in detail above a variety of other actions may also be processed with each call, such that states and global variables or other environmental information is captured and maintained for each call within the log 403.

The wrapper 402 is processed when references are made to the application or the application's API via the calls. One way to achieve this it to name the XSD 401, which defines the wrapper 402, as if it where the application or the application's API. The original application or API is then renamed, such that it is known to the wrapper 402. Neither the issuer nor the application is aware of the wrapper 402. The wrapper 402 is entirely transparent and is not noticed by the application or the issuer. The wrapper 402 is also responsible for ultimately passing the calls on to the application for processing on behalf of the application.

The actions of the wrapper 402 when processed produce the log 403. The log 403 includes content-rich information about the execution sequence of the calls made to the application and about the issuer. The information is tagged and provides a technique for playback and recreating circumstances with the application where an error or problem is detected. As used herein an error may include a perceived performance bottleneck or performance situation that is deemed unacceptable. An error may also include a condition that causes the application to fail or to become unresponsive.

Thus, in some embodiments, the log 403 is used to playback and to recreate a specific processing sequence of events associated with an error. The sequence of events may then be analyzed dynamically or offline to detect the error associated with the application. In an embodiment, the handling associated with fixing the error may be made to the execution logic of the wrapper 402 or may be made to the source associated with the application.

In an embodiment, the application debugging system 400 may be nested within any particular execution environment. An example of such nesting was presented above with respect to the wrapper architecture 100 of FIG. 1. For example, a sub-portion of the application or one of its specific functions may have its own and different version of the schema 401, the wrapper 402, and the log 403. The level of nesting is dependent upon the number of independent wrappers 402 implemented within the architecture for any given call to the application.

Moreover, it is noted that a call to one application may actually generate a call to a different application and that different application may include its own schema 401, wrapper 402, and log. One instance of a wrapper 402 within any given architecture may not be aware of other instances of different wrappers 402 within the architecture. In fact, multiple wrappers 402 do not need to be aware of one another; each instance of a wrapper 402 treats the other remaining instances of wrappers 402 as black box applications in the same manner that any given wrapper 402 treats its application as a black box.

With the application debugging system 400, the schema 401 may be automatically generated for a given application. The execution of the schema 401 represents the actions of the wrapper 402. The wrapper 402 executes in response to calls made to a black box application and dynamically produces the log 403. The log 403 is consumed to recreate problems associated with the application. Furthermore, fixes to problems may be implemented within the wrapper 402 or within a source associated with the application.

In some embodiments, the schema 401 may be used to instruct the wrapper 402, during its execution, to detect data associated with identities or other environmental conditions and information and to uniquely tag and identify that data within the log 403. One technique for doing this with an XSD is to identify xs:ID and xs:IDREF. This permits information to be selectively and uniquely identified within the log 403. Thus, multiple instances of logs can be interfaced to one another for purposes of performing a variety of useful evaluations about the application.

In yet another embodiment, the wrapper 402 may include logic to selectively turn some actions on and/or some actions off based on dynamically detected conditions. Some of these conditions may be occurring in other nested wrappers 402 interfacing with other applications.

According to another embodiment, the information captured in the log 403 may serve as a baseline or behavior for the application. In this manner, other logs 403 subsequently generated may be compared against the baseline to detect performance characteristics or other information that deviates from the baseline. Automated services may be deployed to automatically detect deviations relative to a predefined threshold.

One now appreciates how an application may be treated as a black box for purposes of debugging. This provides novel benefits to customers in that the source of an application does not have to be manipulated in order to resolve a problem. In fact, in some cases with legacy applications the source may not be available at all, such that the techniques presented herein may actually be the only available mechanism for debugging the legacy applications. Furthermore, the amount of captured information within the logs 403 is configurable according to the desires of the customer or consumer. In some embodiments, the logs are XML documents meaning they are portable and may be integrated and consumed by automated services in automated manners.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method to execute on a machine, comprising:
   generating, by the machine, a wrapper for an application, the wrapper is a script that controls input calls and outputs to the application, the application also executes on the machine, each input call is isolated by the wrapper before provided to the application and each output produced by the application is captured by the wrapper;
   executing, by the machine, the wrapper when an issuer makes calls for the application;
   recording, by the wrapper, the calls and processing state information of the calls for the wrapper in a log file;
   mining, by the machine, the log file to adjust performance of the wrapper by altering the wrapper to adjust, by the wrapper, an order of the calls made to the application; and
   passing, by the wrapper, the calls based on the adjusted order through to the application.

2. The method of claim 1 further comprising, passing a result received from the application through the wrapper and back to the issuer and recording the result.

3. The method of claim 1 further comprising:
   detecting, by the wrapper, an error in the application in response to the calls; and patching, by the machine, the error within the wrapper.

4. The method of claim 1 further comprising:
   detecting, by the wrapper, an error in the application in response to the calls; and patching, by the machine, the error within a source of the application.

5. The method of claim 1, wherein generating further includes identifying a syntax for the calls by automatically parsing a header file associated with the application.

6. The method of claim 5 further comprising generating, by the machine, a schema from the header file that is used to derive the wrapper.

7. The method of claim 6, wherein generating the schema further includes enriching at least one of the schema and the wrapper.

8. The method of claim 1, wherein executing further includes making a name associated with an executable of the application point to the wrapper.

9. A machine-implemented method to execute on a machine, comprising:
    generating, by the machine, a wrapper for an application, the wrapper is a script that controls input calls and outputs to the application, the application also executes on the machine, each input call isolated by the wrapper before provided to the application and each output produced by the application is captured by the wrapper;
    intercepting, by the wrapper, a plurality of calls directed to the application, a source for the application is unavailable, only an executable for the application is available for interacting with the application;
    recording, by the wrapper, the calls and state information of each call in a log file;
    mining, by the machine, the log file to adjust performance of the wrapper by altering the wrapper to adjust, by the wrapper, an order of the calls made to the application; and
    passing, by the wrapper, the calls based on the adjusted order to the application for execution.

10. The method of claim 9 further comprising, recording results returned from the application in response to the passed calls.

11. The method of claim 9 further comprising:
    detecting, by the wrapper, an error in processing associated with the application;
    and playing, by the machine, back a sequence of the plurality of calls that preceded the error.

12. The method of claim 9, wherein passing further includes:
    intercepting the calls a second time; and
    recording the calls another time before passing the calls to the application for execution.

13. The method of claim 9, wherein recording further includes interactively producing one or more extensible markup language (XML) documents while recording the calls.

14. The method of claim 13 further comprising automatically enriching, by the machine, the XML documents to correlate with references defined in a schema to elements produced in the XML documents which are selectively associated with data of the calls.

15. The method of claim 13 further comprising at least one of:
    merging, by the machine, one or more of the XML documents together;
    extracting, by the machine, selective information from the one or more XML documents; and
    analyzing, by the machine, the one or more XML documents.

16. The method of claim 9 further comprising, performing, by the machine, one or more additional operations before passing the calls to the application, wherein the one or more additional operations are identified in a schema associated with the intercepted plurality of calls.

17. The method of claim 16, wherein performing further includes maintaining selective global variables with each of the recorded calls.

* * * * *